US009840292B2

(12) United States Patent
Baum et al.

(10) Patent No.: US 9,840,292 B2
(45) Date of Patent: Dec. 12, 2017

(54) SEGMENTED TRACK

(71) Applicants: Soucy International Inc., Drummondville (CA); CONCURRENT TECHNOLOGIES CORPORATION, Johnstown, PA (US)

(72) Inventors: Alan William Baum, Homer City, PA (US); Joseph Anthony Casalena, Bedford, PA (US); Matthew John Golden, Summerhill, PA (US); Éric Bastien, St-Lucien (CA); Vincent Blouin, Drummondville (CA); Rémi Breton, Drummomdville (CA); Francois Duquette, Drummomdville (CA); Kevin Poulin, Aurora (CA); Paul Joseph McMullen, Jr., Johnstown, PA (US)

(73) Assignees: SOUCY INTERNATIONAL INC., Drummondville (CA); CONCURRENT TECHNOLOGIES CORPORATION, Johnstown, PA (US)

( * ) Notice: Subject to any disclaimer, the term of this patent is extended or adjusted under 35 U.S.C. 154(b) by 0 days.

(21) Appl. No.: 14/866,433

(22) Filed: Sep. 25, 2015

(65) Prior Publication Data
US 2016/0083029 A1    Mar. 24, 2016

Related U.S. Application Data

(62) Division of application No. 13/202,179, filed as application No. PCT/IB2010/000331 on Feb. 19, 2010, now Pat. No. 9,174,688.

(60) Provisional application No. 61/153,865, filed on Feb. 19, 2009.

(51) Int. Cl.
| B62D 55/21 | (2006.01) |
| B62D 55/24 | (2006.01) |
| B62D 55/20 | (2006.01) |
| B62D 55/27 | (2006.01) |

(52) U.S. Cl.
CPC .......... *B62D 55/21* (2013.01); *B62D 55/202* (2013.01); *B62D 55/24* (2013.01); *B62D 55/27* (2013.01)

(58) Field of Classification Search
None
See application file for complete search history.

(56) References Cited

U.S. PATENT DOCUMENTS

| 1,966,450 | A | * | 7/1934 | Knox | B62D 55/211 |
| | | | | | 305/160 |
| 2,392,383 | A | * | 1/1946 | Hollenkamp | B62D 55/205 |
| | | | | | 305/201 |
| 3,357,750 | A | * | 12/1967 | Reynolds | B62D 55/205 |
| | | | | | 305/189 |
| 3,602,364 | A | | 8/1971 | Maglio et al. | |

(Continued)

*Primary Examiner* — Kip T Kotter
(74) *Attorney, Agent, or Firm* — Robert Brouillette; Brouillette Legal Inc.

(57) ABSTRACT

A segmented track made of a plurality of elastomeric track segments is provided. Each track segment is made of reinforced elastomeric material and is provided, at each end thereof, with a joint element adapted to be connected to the joint element of adjacent track segments. Each track segment comprises longitudinally extending reinforcing elements which are embedded into the elastomeric material and which are extending between and coupled to both joint elements.

16 Claims, 14 Drawing Sheets

(56) References Cited

U.S. PATENT DOCUMENTS

| | | | |
|---|---|---|---|
| 3,734,576 | A | 5/1973 | Heiple et al. |
| 4,145,092 | A | 3/1979 | Kasin |
| 4,681,377 | A | 7/1987 | Atkin et al. |
| 5,058,963 | A | 10/1991 | Wiesner et al. |
| 7,114,788 | B2 | 10/2006 | Deland et al. |
| 7,396,091 | B2 | 7/2008 | Welp et al. |
| 2003/0015917 | A1 | 1/2003 | Yovichin et al. |
| 2004/0222697 | A1 | 11/2004 | Soucy et al. |
| 2009/0218882 | A1 * | 9/2009 | Rowbottom ........... B62D 55/21 305/158 |

* cited by examiner

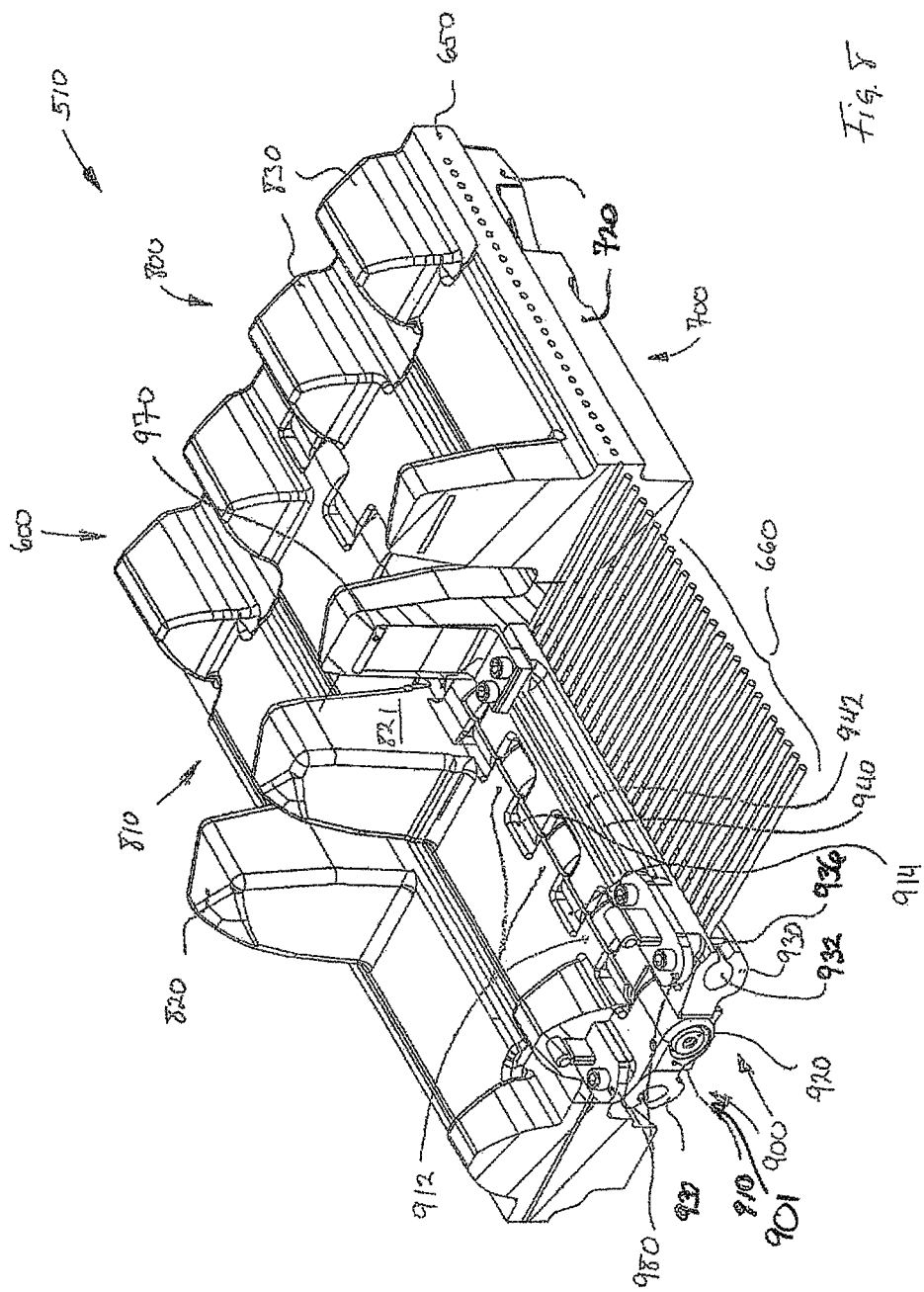

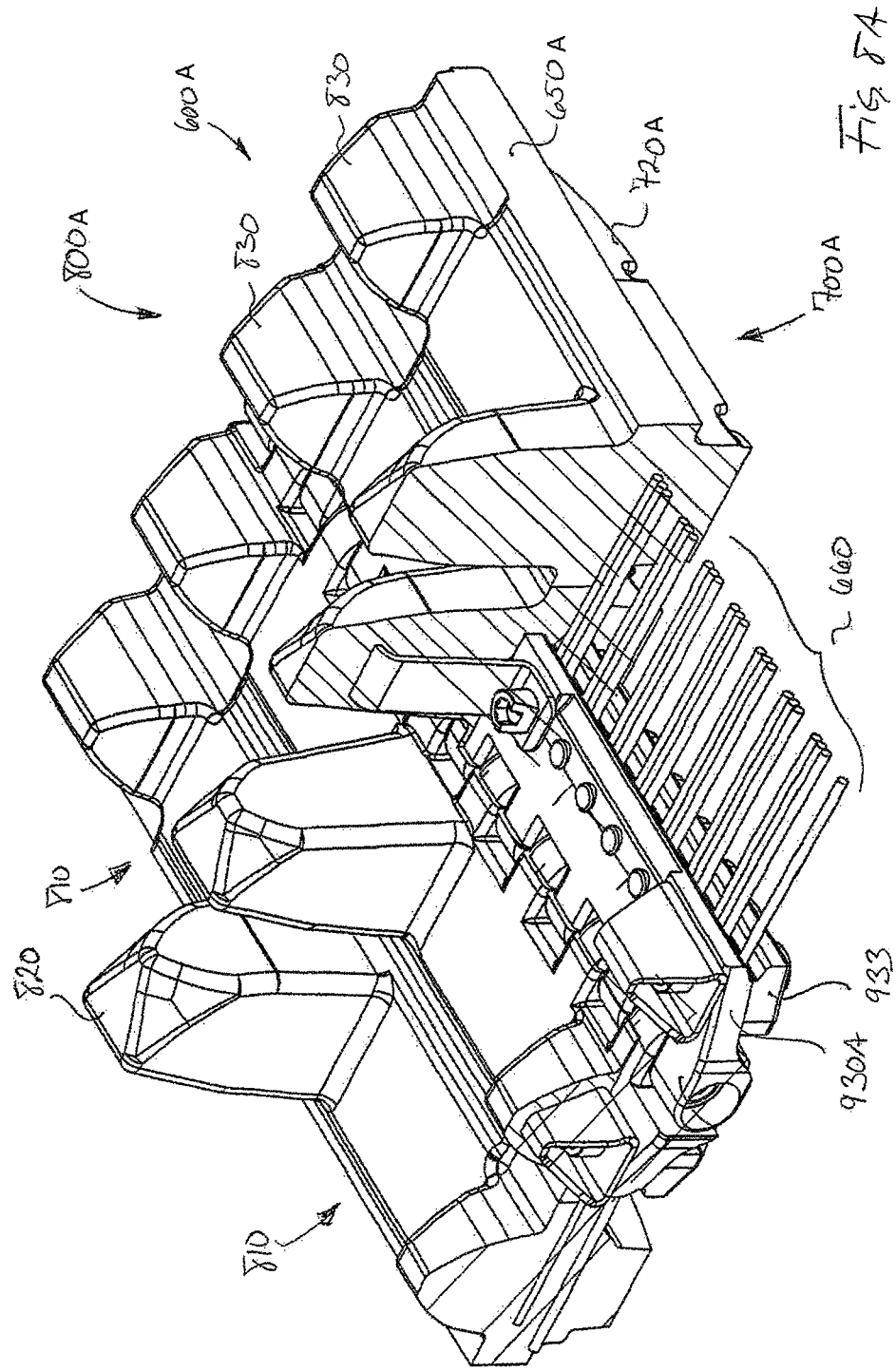

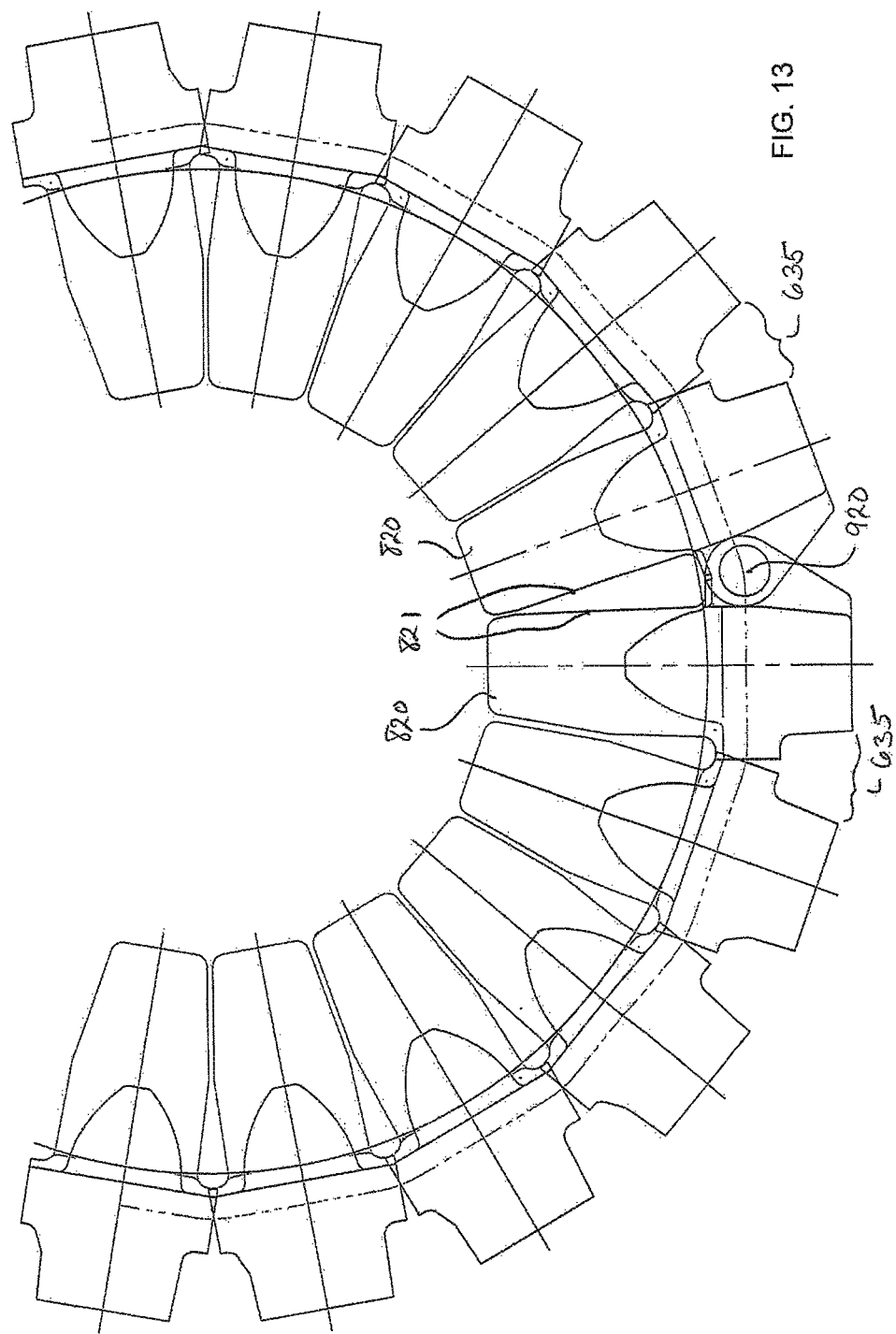

SEGMENTED TRACK

CROSS-REFERENCE TO RELATED APPLICATIONS

The present patent application is a divisional application of U.S. patent application Ser. No. 13/202,179, entitles "Segmented Track" and filed at the United States Patent and Trademark Office on Aug. 18, 2011 which is a US national phase application of PCT application No. PCT/IB/2010/000331 entitled "Segmented Track" and filed at the International Bureau of the World Intellectual Property Organization on Feb. 19, 2010 and which was granted as the U.S. Pat. No. 9,174,688 on Nov. 3, 2015 and which claims the benefits of priority of U.S. Provisional Patent Application No. 61/153,865, entitled "Segmented Track" and filed at the United States Patent and Trademark Office on Feb. 19, 2009. The content of all of the above are incorporated herein by reference.

FIELD OF THE INVENTION

The present invention generally relates to segmented traction bands and endless tracks for use on tracked vehicles and other vehicles using tracks for propulsion. More particularly, but without being limitative in nature, the present invention relates to segmented tracks for use of heavy tracked vehicles such as military vehicles, agricultural vehicles, forestry vehicles and industrial vehicles.

BACKGROUND OF THE INVENTION

It has long been recognized that unitary endless elastomeric tracks had the fundamental problem of becoming useless upon being damaged. Indeed, once such a track is damaged, it generally has to be completely replaced by a new elastomeric track. This can be particularly difficult in some contexts such as on a battle field or in a construction zone.

To mitigate this problem while keeping the main advantages of elastomeric tracks (i.e. reduced noise, reduced weight, reduced damages on pavement, etc.), elastomeric tracks have sometimes been made of a plurality of interconnected elastomeric segments instead of being unitary.

Though elastomeric segmented tracks have their inherent advantages, such as providing the ability to replace only damaged or worn out segment or segments, segmented tracks also have their problems.

For instance, in order to connect each segment together, each segment is provided with joints. However, joints create discontinuities in the elastomeric material and in the longitudinal reinforcements (e.g. reinforcing cables or cords) where failures typically occur. Several segmented tracks have been proposed throughout the years to try to mitigate this and other problems. See for instance, U.S. Pat. Nos. 2,338,819; 2,385,453; 2,402,042; 3,151,443; 3,212,627; 3,734,576; 5,058,963 and 7,396,091.

However, the foregoing segmented elastomeric tracks were not designed nor configured to be used on heavy tracked vehicles such as military vehicles, agricultural vehicles, forestry vehicles and industrial vehicles. Heavy tracked vehicles, due to their inherent large size and weight, need to have tracks which, on the one hand, provide a large ground-contacting surface, and, on the other hand, are flexible enough to wrap around the various wheels of the vehicle (e.g. sprocket wheel, idler wheel and road wheels) and to absorb some temporary deformations.

Consequently, elastomeric tracks used on heavy track vehicles typically comprise several longitudinally extending pitch sections interconnected by short flexible sections. Moreover, to maximize the ground-contacting surface of the track, the length of the flexible sections is usually significantly shorter than the length of the pitch sections.

In addition, the joint elements interconnecting the track segments need to be strong enough to support the longitudinal forces exerted by the vehicle. Unfortunately, prior art segmented track configurations failed to address such segmented track design considerations and are therefore of very limited use on heavier vehicles.

Hence, despite ongoing development in the field of segmented traction bands and endless tracks, there is still a need for a novel segmented track which mitigates the shortcomings of the prior art and which addresses the needs of segmented traction bands and endless tracks used particularly on heavy tracked vehicles.

SUMMARY OF THE INVENTION

The principles of the present invention are generally embodied in a segmented track and track segments therefor.

According to one aspect of the present invention, a segmented track comprising a plurality of interconnected track segments, wherein each of said track segments comprises a segment body made of reinforced elastomeric material and having an outer ground-engaging surface, an inner wheel-engaging surface, a first extremity and a second extremity, said segment body comprising a plurality of longitudinally extending sections, each of said sections having a pitch length and being attached to at least one adjoining segment by a flexible portion having a second length and being devoid of any lugs, said sections comprising a first extreme section located at said first extremity and comprising a first joint element, and a second extreme section located at said second extremity and comprising a second joint element, and regular sections therbetween, said first joint element comprising a first hinge portion and a first anchoring portion, said second joint element comprising a second hinge portion and a second anchoring portion, said track segment comprising longitudinally extending reinforcing elements mounted to and extending between said first and second anchoring portions;

wherein said first hinge portion is respectively connected to said second hinge portion with a hinge pin; and wherein the pitch length of said sections being longer than the second length of flexible portions.

Hence, a segmented track in accordance with the principles of the present invention typically comprises a plurality of track segments connected end-to-end, each track segment comprising a longitudinally extending segment body made from reinforced elastomeric material and having embedded therein, at each end thereof, a joint element.

The segment body has an outer ground-engaging surface and an inner wheel-engaging surface and is further partitioned into a plurality of longitudinally extending sections (i.e. pitch sections) interconnected by flexible portions.

Each section is provided, on its outer surface, with one or more traction lugs and, on its inner surface, with laterally spaced-apart drive lugs and/or guide lugs defining wheel paths therebetween. The traction lugs are configured to engage the ground and to provide traction whereas the drive lugs are configured to engage and mesh with the sprocket wheel of the vehicle. For their part, the guide lugs are configured to guide the track over the various wheels of the vehicle and to prevent occurrences of detracking.

In order to remain flexible, the flexible portions connecting adjacent sections are preferably devoid of any lugs.

The section located at the first extremity of the segment body, the first extreme section, is provided with a first joint element which is mostly embedded therein. Similarly, the section located at the second extremity of the segment body, the second extreme section, is provided with a second joint element which is also mostly embedded therein. The segment body further comprises, embedded therein, longitudinally extending reinforcing elements attached to and extending between the joint elements.

In accordance with an aspect of the present invention, in order to prevent premature wearing and/or failure of the track segments, it has been found preferable that the mechanical behaviour of the extreme sections and of the regular sections located inbetween be substantially equivalent.

Hence, in accordance with this aspect of the present invention, the lateral flexibility of the guide lugs located on the extreme sections is preferably substantially equal to the lateral flexibility of the guide lugs located on the regular sections. Similarly, the longitudinal flexibility of the drive lugs located on the extreme sections is preferably substantially equal to the longitudinal flexibility of the drive lugs located on the regular sections.

In accordance with another aspect of the present invention, in order to prevent premature wearing and/or failure of the joint elements, it has been found preferable that the mechanical behaviour of the joint element interconnection and of the flexible portion of the track segments be substantially equivalent.

Hence, in accordance with this aspect of the present invention, the length of the extreme sections is preferably slightly longer than the length of the regular sections in order to take into account the differences in the longitudinal behaviour of the joint element interconnection with respect to the flexible portions.

Other and further aspects and advantages of the present invention will be obvious upon an understanding of the illustrative embodiments about to be described or will be indicated in the appended claims, and various advantages not referred to herein will occur to one skilled in the art upon employment of the invention in practice. The features of the present invention which are believed to be novel are set forth with particularity in the appended claims.

BRIEF DESCRIPTION OF THE DRAWINGS

The features and advantages of the invention will become more readily apparent from the following description, reference being made to the accompanying drawings in which:

FIG. 8 is a perspective cut-out view of the inner surface of a portion of another exemplary segmented track having a single-pin joint.

FIG. 8A is a perspective cut-out view of the inner surface of a portion of a variant of the exemplary segmented track of FIG. 8.

FIG. 13 is a side view of the track of FIG. 8 as wrapped around a schematized wheel.

DETAILED DESCRIPTION OF THE PREFERRED EMBODIMENT

A novel segmented traction band will be described hereinafter. Although the invention is described in terms of specific illustrative embodiments, it is to be understood that the embodiments described herein are by way of example only and that the scope of the invention is not intended to be limited thereby.

Figure 1:
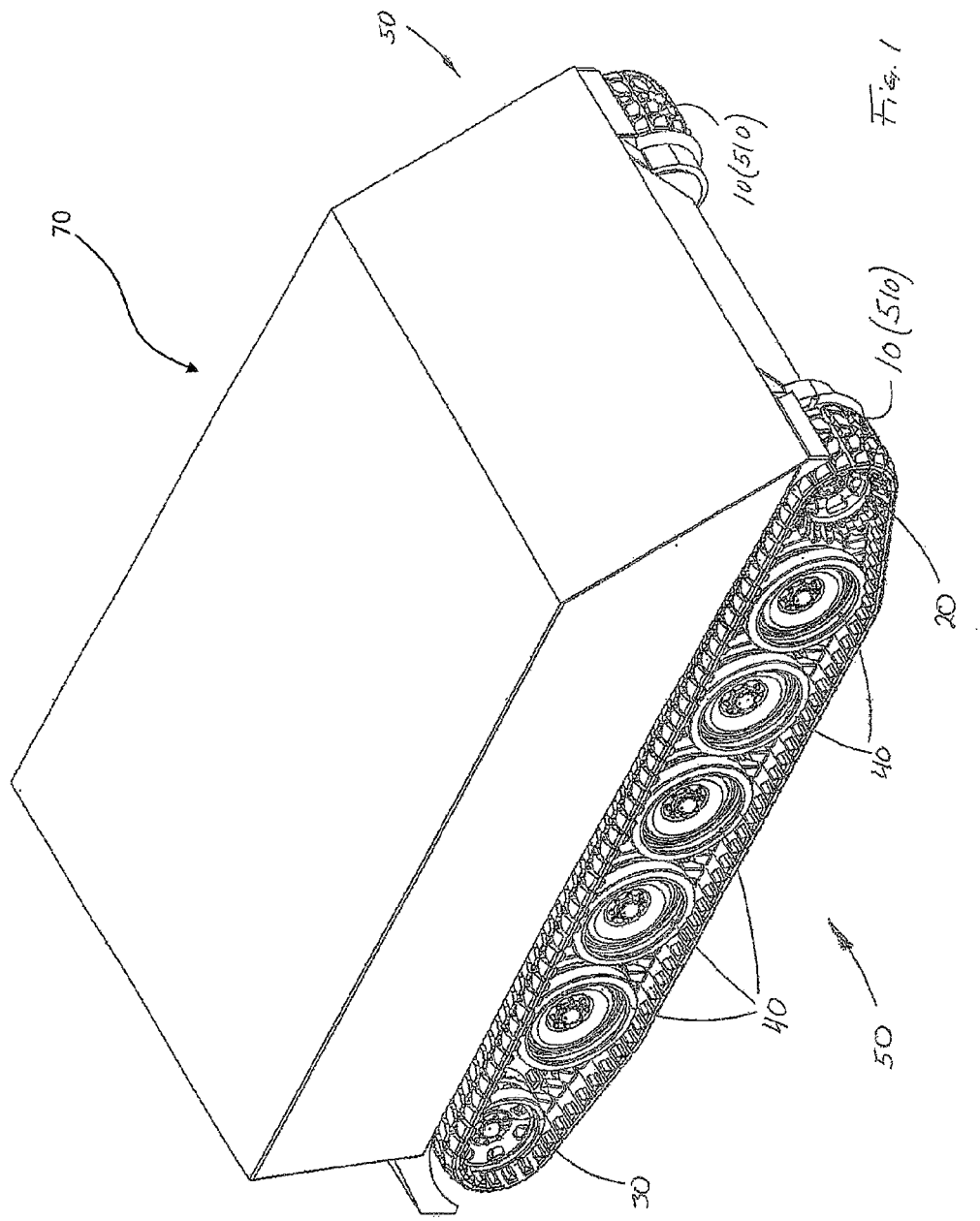
FIG. 1 is a front perspective view of an exemplary heavy tracked vehicle having two track systems.

Endless tracks such as the endless tracks 10 and 510, about to be described, are typically used on heavy tracked vehicles such as the exemplary military tracked vehicle 70 depicted in FIG. 1. Typically, a tracked vehicle, such as tracked vehicle 70, comprises two track systems 50, one on each side thereof. Each track system 50 conventionally comprises a sprocket wheel 20 and an idler wheel 30 respectively shown in FIG. 1 at the fore and at the aft of vehicle 70. The track system 50 also typically comprises a series of road wheels 40 located between the sprocket wheel 20 and the idler wheel 30. Such track systems are generally well known in the art and need not be further described.

Double-Pin Segmented Track

Referring now to FIGS. 2 to 7, a first exemplary embodiment of a segmented track 10 incorporating the principles of the invention is depicted. As it will be best understood hereinafter, this first segmented track 10 is generally referred to as a double-pin segmented track 10.

Figure 2:
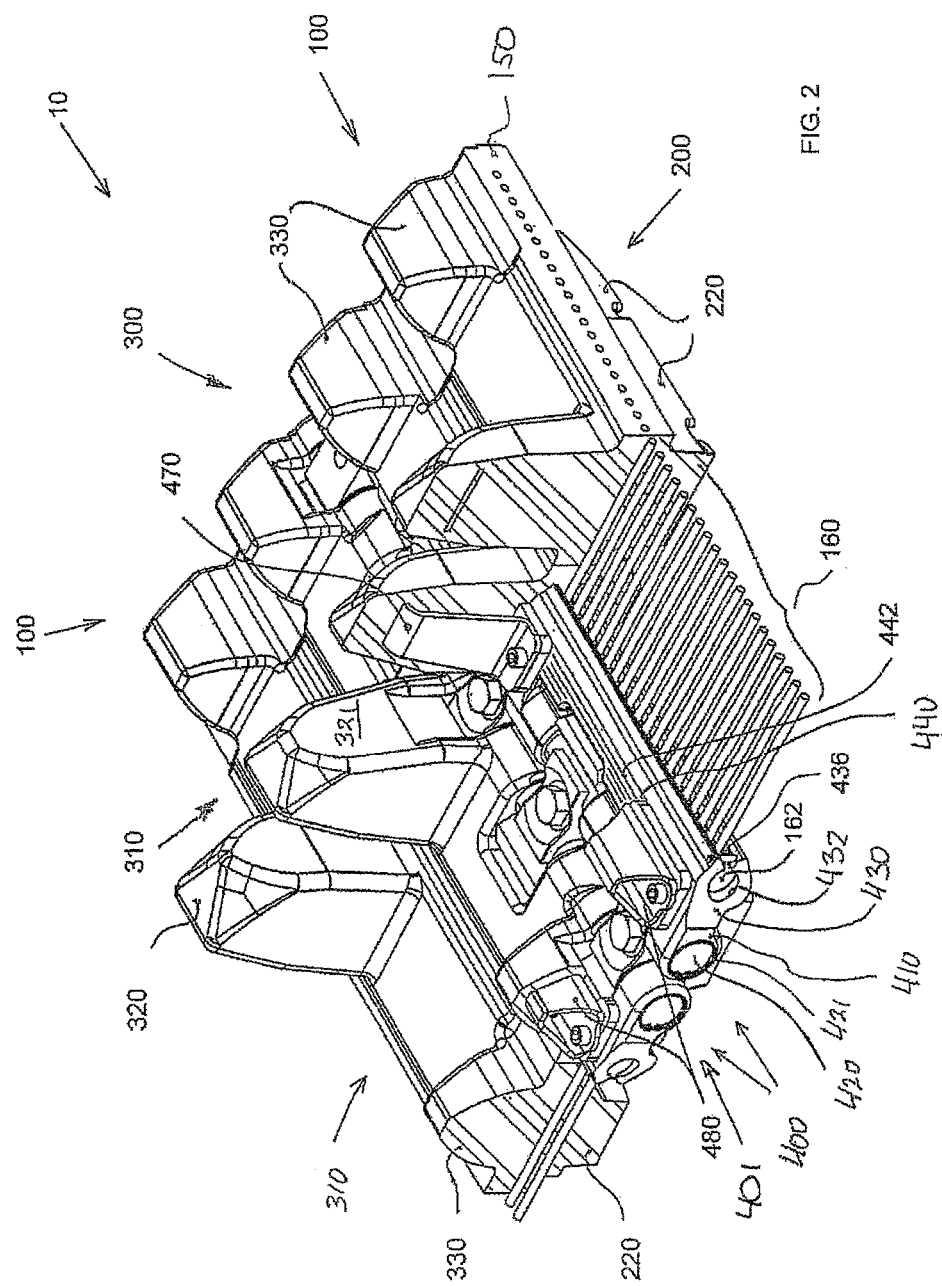
FIG. 2 is a perspective cut-out view of the inner surface of a portion of an exemplary segmented track having a double-pin joint.

Referring to FIG. 2, a portion of the segmented track 10 is shown in more details. The segmented track 10 generally comprises several track segment 100 connected end-to-end via joint elements 400; only two of such segments 100 are shown in FIG. 2.

Track segments 100 are generally identical in construction, except for their length which could possibly vary, and comprise a longitudinally extending track or segment body 150 made of reinforced elastomeric material. Each track segment 100 is provided with two joint elements 400, one at each end thereof. The joint elements 400 are generally integrated to the track body 150 of the track segment 100 during the moulding of the latter.

Figure 3:
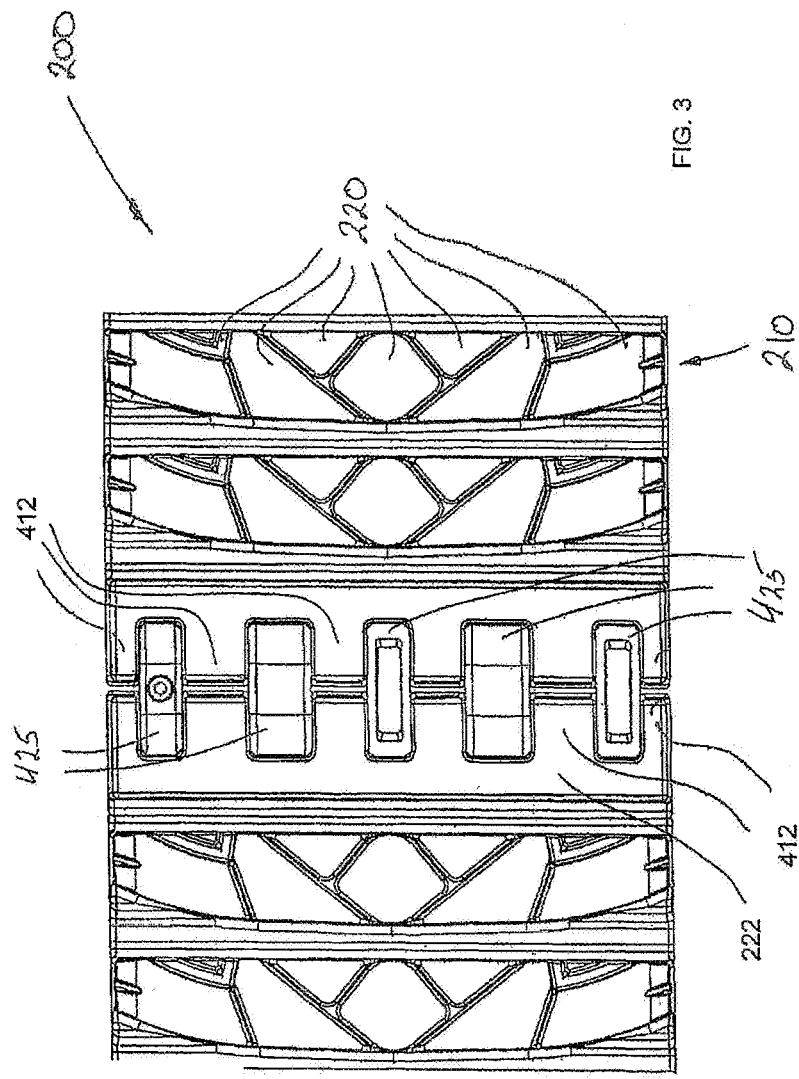
FIG. 3 is an elevation view of the outer surface of the track of FIG. 2.
Figure 4:
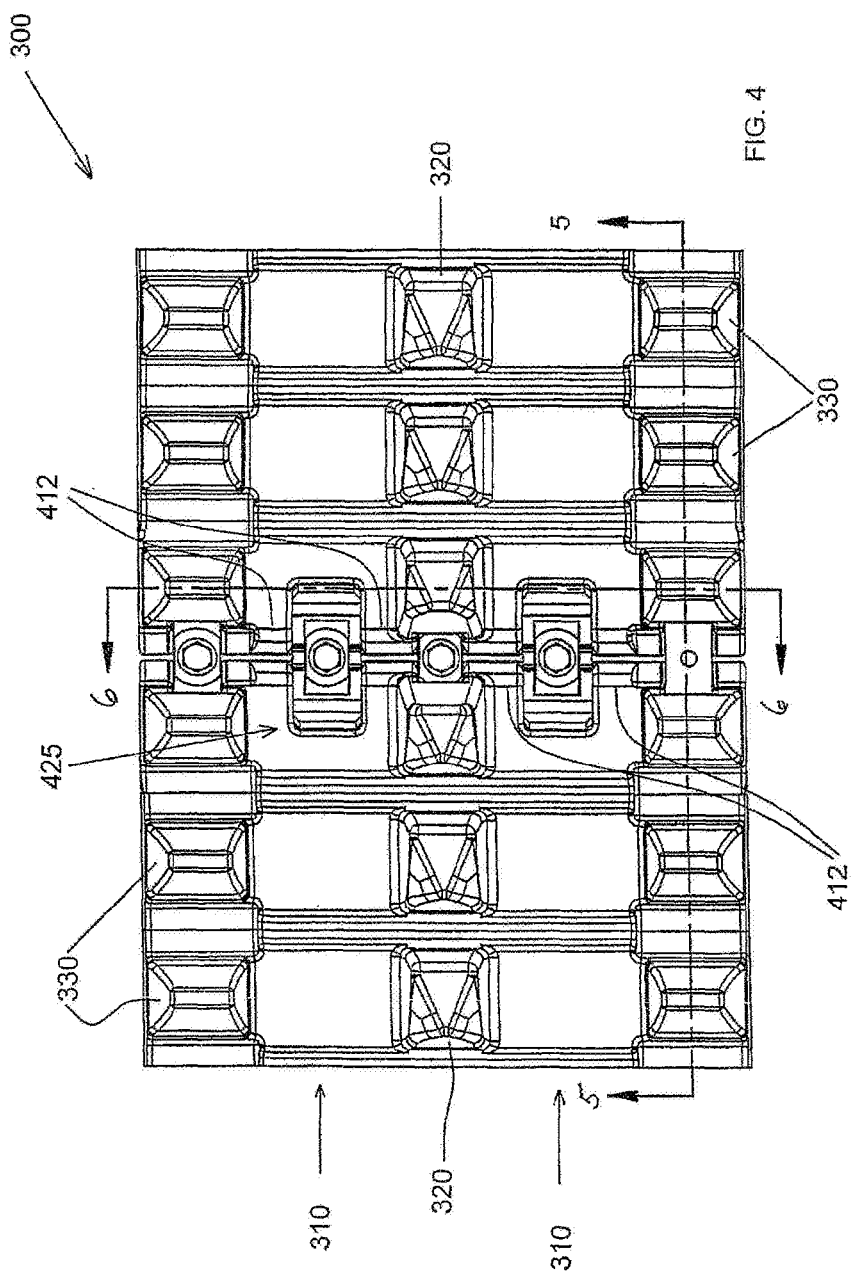
FIG. 4 is an elevation view of the inner surface of the track of FIG. 2.

As depicted in FIGS. 2 to 4, each track segment 100 defines a ground-engaging outer surface 200 and a wheel-engaging inner surface 300. As best shown in FIG. 3, the outer surface 200 is generally provided with a tread 210 composed of a pattern of ground-engaging traction lugs 220. Understandably, the exact shape, configuration and/or disposition of the traction lugs 220 will vary according to the environment in which the track 10 is intended to be used.

Hence, different patterns could be used; the present invention is not limited to any particular traction lugs pattern.

For its part, the inner surface 300, best shown in FIG. 4, is generally provided with one or more rows of longitudinally aligned guide lugs 320 and drive lugs 330. The guide lugs 320 generally serve to guide the track 10 between and around the various wheels (i.e. sprocket wheel 20, idler wheel 30 and/or road wheels 40) of the track system 50 (see FIG. 1), and to prevent and/or reduce lateral movements of the track 10 which could lead to detracking. For their part, the drive lugs 330 are generally configured to mesh with the sprocket wheel 20 such as to transmit the power from the motor (not shown) of the vehicle 70 to the track 10.

The guide lugs 320 and the drive lugs 330 are typically laterally spaced along the width of the track segment 100 in order to define wheel path 310 for the various wheels of the track system 50. In the present preferred embodiment, the guide lugs 320 are substantially centrally located with respect to the width of the track segment 100 while the drive lugs 330 are substantially respectively located near the side or lateral edges of track segment 100; other configurations are however possible, the present invention is not so limited.

Figure 5:
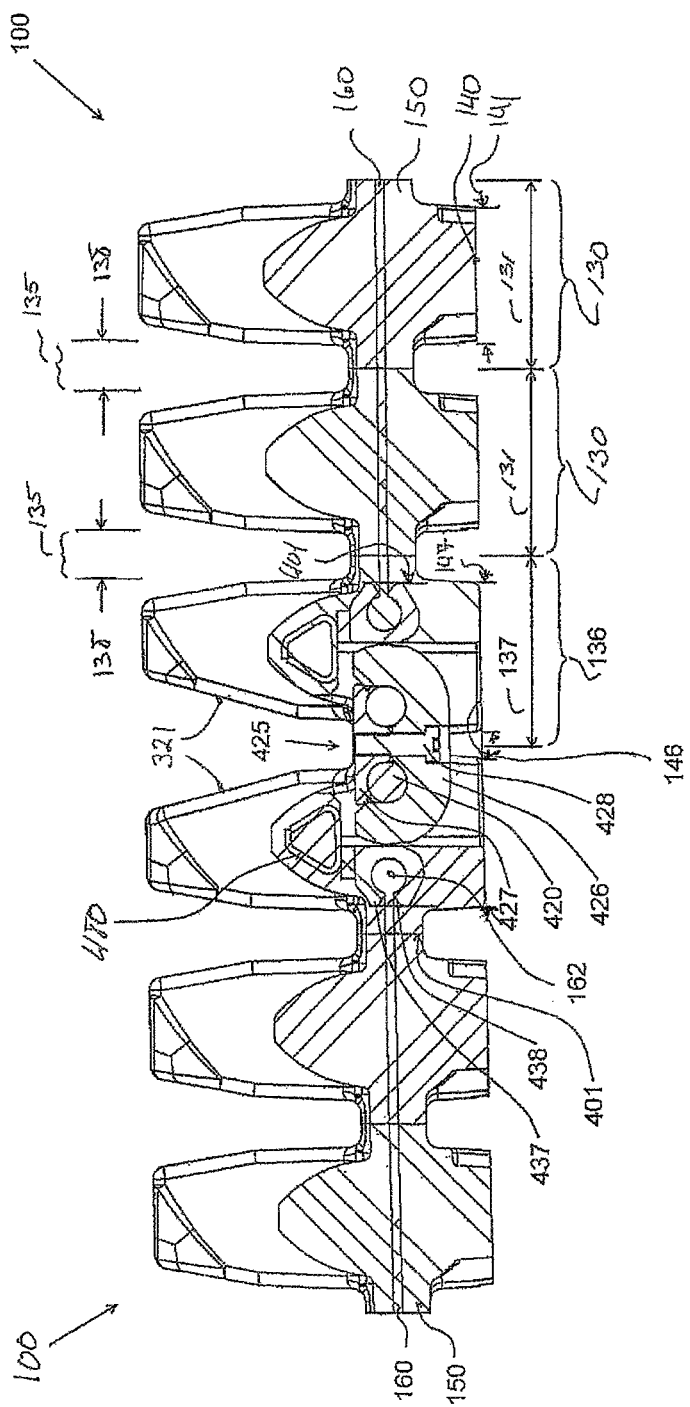
FIG. 5 is a cross-sectional side view of the track of FIG. 2 along line 5-5 of FIG. 4.

Referring now to FIG. 5, the track body 150 of each track segment 100 is generally divided, along its length, into a plurality of longitudinally extending pitch sections 130 defining a pitch length 131. Each pitch section 130 is connected to its adjacent pitch sections 130 via flexible section 135 having length 138 and preferably devoid of any lugs. These flexible sections 135 generally allow the track body 150 to bend around the sprocket wheel 20 and idler wheel 30 and road wheels 40 of the track system 50.

As depicted in FIGS. 3 and 5, the traction lug(s) 220 located on the outer surface 200 of each regular section 130 define a ground-contacting area 140 (see FIG. 5) having a length 141. Similarly, the traction pad 222 located on the outer surface 200 of each extreme section 136 defines a ground-contacting area 146 having a length 147. Preferably, though not necessarily, the length 147 of the ground-contacting area 146 is slightly longer than the length 141 of the ground-contacting areas 140.

Notably, as explained above, and as is apparent from FIG. 5, the length 138 of the flexible sections 135 is significantly shorter than the length 131 of the pitch sections 130. This allows the sections 130 and 136 to have large ground-contacting areas 140 and 146 respectively.

Since track segments 100 must be connected together in order to form the endless track 10, the pitch sections 136 respectively located at each extremity of each track segment 100, i.e. the extreme pitch sections 136, are each provided with a joint element 400 mostly embedded therein (see also FIG. 2).

Each joint element 400 comprises a hinge portion 410 and an anchoring portion 430. As depicted in FIGS. 2 to 4 and 7, the hinge portion 410 comprises a series of laterally extending and spaced apart hinge sections 412, each provided with a cylindrical passage or bore 413 through which hinge pin 420 is pivotally mounted. Once mounted into the cylindrical passages 413, the hinge pin 420 is generally held in place via retaining rings 421 or other functionally equivalent retainers.

The interior surface of the cylindrical passages 413 can advantageously be provided with bushings to reduce friction between the hinge pin 420 and the interior surface of the passages 413, to allow a better rotation of the hinge pin 420 within the passages 413, and to prevent premature wearing of the hinge pin 420 and the interior surface of the passages 413.

As depicted in FIGS. 2, 4 and 5, to attach two track segments 100 together, the exposed portions of the hinge pins 420 extending between adjacent hinge sections 412 of adjacent joint elements 400 are secured together by clamp connectors 425. Each clamp connector 425 generally comprises two complementary clamp members 426 and 427 connectable together by means of a fastener 428 such as a bolt.

As the skilled addressee will understand, when two adjacent joint elements 400 are connected together, the connected joint elements 400 do not bend or flex as the elastomeric material of the flexible sections 135. Hence, as the track 10 wraps around the sprocket wheel 20, the idler wheel 30 or the road wheels 40 of the vehicle 70 (schematically shown in FIG. 7), the behaviour of the connected joint elements 400 in bent state differs from the behaviour of flexible sections 135 in bent state.

It has been found, during experimentations, that when the pitch length 137 of the extreme pitch sections 136 (see FIG. 5) was equal to the pitch length 131 of the regular pitch sections 130, portions of the track segments 100 located near the joint elements 400 would suffer damages.

The solution found to reduce these damages was to have the pitch length 137 of the extreme pitch sections 136 slightly longer than the pitch length 131 of the regular pitch sections 130 in order to compensate for the difference in bending behaviour.

For instance, in the tracks tested, it appeared that to reduce the aforementioned damages, the pitch length 137 would need to be between about 0% and 2% longer than the pitch length 131, preferably between about 0.5% and 1.5% longer and most preferably about 1% longer. Understandably, the percentage could vary depending on the exact track system, track and/or joint design; the present invention is not limited to the percentage indicated above.

At this point, the skilled addressee will note that, as is apparent from FIG. 5, when two joint elements 400 are connected together, their combined length 401 is longer than the length 131 of regular pitch sections 130. This is due to the particular configuration of the track segment 100 wherein the flexible sections 135 are significantly shorter than the pitch sections 130.

Referring now to FIGS. 2 and 5, as mentioned above, each joint element 400 comprises a hinge portion 410 and an anchoring portion 430. The anchoring portion 430 serves to retain the longitudinally extending reinforcing cables 160 which are typically used to limit the longitudinal extension of the track segment 100 during use.

Preferably, each cable 160 is provided, at each of its ends, with retaining elements such as ferrules 162 adapted to be received and retained in the anchoring portion 430.

In the present embodiment, the ferrules 162 are substantially cylindrical in shape and the axis of the ferrules 162 is preferably parallel to the flexion axis of the track segment 100 and to the rotation axis of the hinge pin 420. As best shown in FIGS. 2 and 5, each ferrule 162 is received into the substantially cylindrical channel 432 of the C-shaped anchoring portion 430 of the joint element 400. The anchoring portion 430 is also provided with a laterally extending opening 436 through which the cables 160 extend. The internal diameter of the channel 432 is preferably slightly larger than the diameter of the ferrules 162 such that the ferrules 162 can be slidingly inserted into the channel 432 without too much resistance.

As best shown in FIG. 5, the opening 436 is preferably provided with stress relief zones 437 and 438 to prevent premature chafing, wearing and/or breaking of the cables 160. The shape of the stress relief zones 437 and 438 will generally depend on several factors such as the construction of the track segment 100 and the size of the cables 160.

As the skilled addressee will understand, since the axis of the ferrules 162 is parallel to the flexion axis of the track segment 100, the ferrules 162 will, in certain circumstances, be able to slightly pivot within the channel 432 as the track segment 100 bends. This limited degree of liberty can, in certain circumstances, contribute to reducing the strain applied to the cables 160 during bending of the track segment 100. It is to be understood that in segmented tracks, failures often occur where the cables are secured to the joint elements and at the interface between the cables and the ferrules. Hence, any incremental improvement to the interface between the cables and the joint elements is beneficial to the durability of the track segment(s).

In a variant of the present embodiment, the extremities of the cables 160 could be connected to a group of larger ferrules 163 (i.e. one ferrule for several cable ends) or to a single unitary ferrule 164 (i.e. one ferrule for all the cable ends). This would understandably reduce manufacturing time but could limit the degree of movement of each cable 160.

In still another variant of the present embodiment, the cables 160 could directly be connected to the anchoring portion 430 without ferrules 162. For example, the extremities of the cables 160 could be soldered or brazed directly to the anchoring portion 430 or, as depicted in FIG. 8A, held in place by one or more compression plates. Understandably, other methods are also possible.

It has been found, during the exhaustive experimentations already mentioned above, that to prevent premature wearing and/or failure of the track segment and the joint elements thereof, the mechanical behaviour of the extreme pitch sections and of the regular pitch sections should be substantially equivalent.

More particularly, it has been found that the lateral flexibility of the guide lugs 320 located on the extreme pitch sections 136, and over the joint element 400, should be substantially equal to the lateral flexibility of the guide lugs 320 located on the regular pitch sections 130. In other word, when subjected to the same lateral force, the lateral deflection of the guide lugs 320 located on the extreme pitch sections 136 should be substantially equal to the lateral deflection of the guide lugs 320 located on the regular pitch sections 130.

Similarly, it has been found that the longitudinal flexibility of the drive lugs 330 located on the extreme pitch sections 136, and over the joint element 400, should be substantially equal to the longitudinal flexibility of the drive lugs 330 located on the regular pitch sections 130. In other word, when subjected to the same longitudinal force, the longitudinal deflection of the drive lugs 330 located on the extreme pitch sections 136 should be substantially equal to the longitudinal deflection of the drive lugs 330 located on the regular pitch sections 130.

Figure 6:
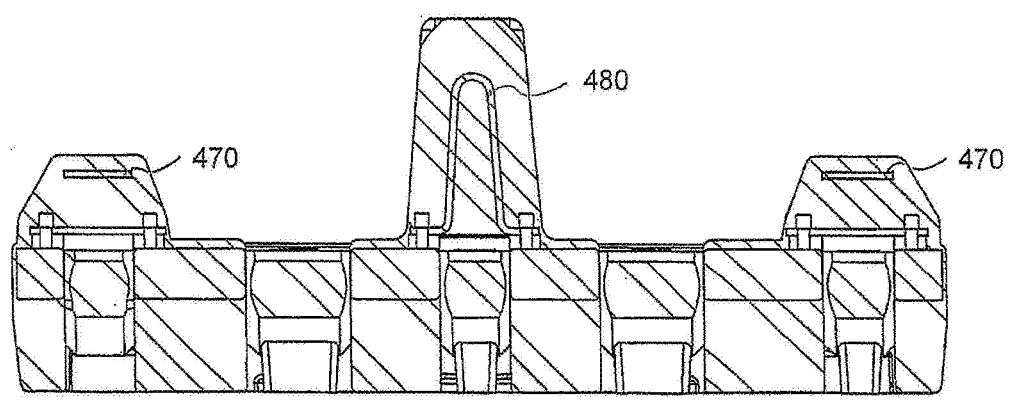
FIG. 6 is a cross-sectional longitudinal view of the track of FIG. 2 along line 6-6 of FIG. 4.

Referring now to FIGS. 2, 5 and 6, each joint element 400 is preferably provided with a guide lug reinforcing element 470 and with drive lug reinforcing elements 480.

The guide lug reinforcing element 470 and the drive lug reinforcing element 480, which shapes respectively depend on the shape of the guide lugs 320 and of the drive lugs 330, serve an important purpose. At the interface between the track body 150 and the joint element 400, there is less elastomeric material underneath the guide lug 320 and the drive lugs 330 as they are formed directly over the joint element 400. The reinforcing elements 470 and 480 thus serve to prevent excessive deflection which could cause cracking and tearing near the base of the guide lug 320 and/or of the drive lug 330.

Preferably, the reinforcing elements 470 and 480 are respectively designed such that the lateral flexibility of the guide lug 320 located on the extreme pitch sections 136 is substantially equal to the lateral flexibility of the guide lug 320 located on the regular pitch sections 130, and such that the longitudinal flexibility of the drive lugs 330 located on the extreme pitch sections 136 is substantially equal to the longitudinal flexibility of the drive lugs 330 located on the regular pitch sections 130.

The reinforcing elements 470 and 480 are preferably made of rigid yet resilient material such as, but not limited to, sheet steel. Indeed, though the reinforcing elements 470 and 480 provide additional support to the guide lugs 320 and to the drive lugs 330, they still have to resiliently absorb reasonable deflection under normal driving condition.

Still, it is to be understood that the need for additional support for the guide lugs 320 and drive lugs 330 located over the joint elements 400 can vary according to several factors such as the size of the track, the size of the vehicle, the power of the vehicle, etc.

In addition, it has been found during the exhaustive experimentations already mentioned above, that when the width of the guide lugs 320 located over the joint element 400 was slightly narrower than the width of the other guide lugs 320, the guide lugs 320 located over the joint element 400 would suffer less damages as its lateral flexibility would be comparable to the lateral flexibility of the other guide lugs 320.

In the tested tracks, the width of the guide lugs 320 located over the joint element 400 was between about 80% and 100%, preferably between about 85% and 95%, and most preferably about 90% of the width of the other guide lugs 320.

Understandably, the exact width of the guide lugs 320 located over the joint element 400 could vary according to the track system, track and/or joint design.

Figure 7:
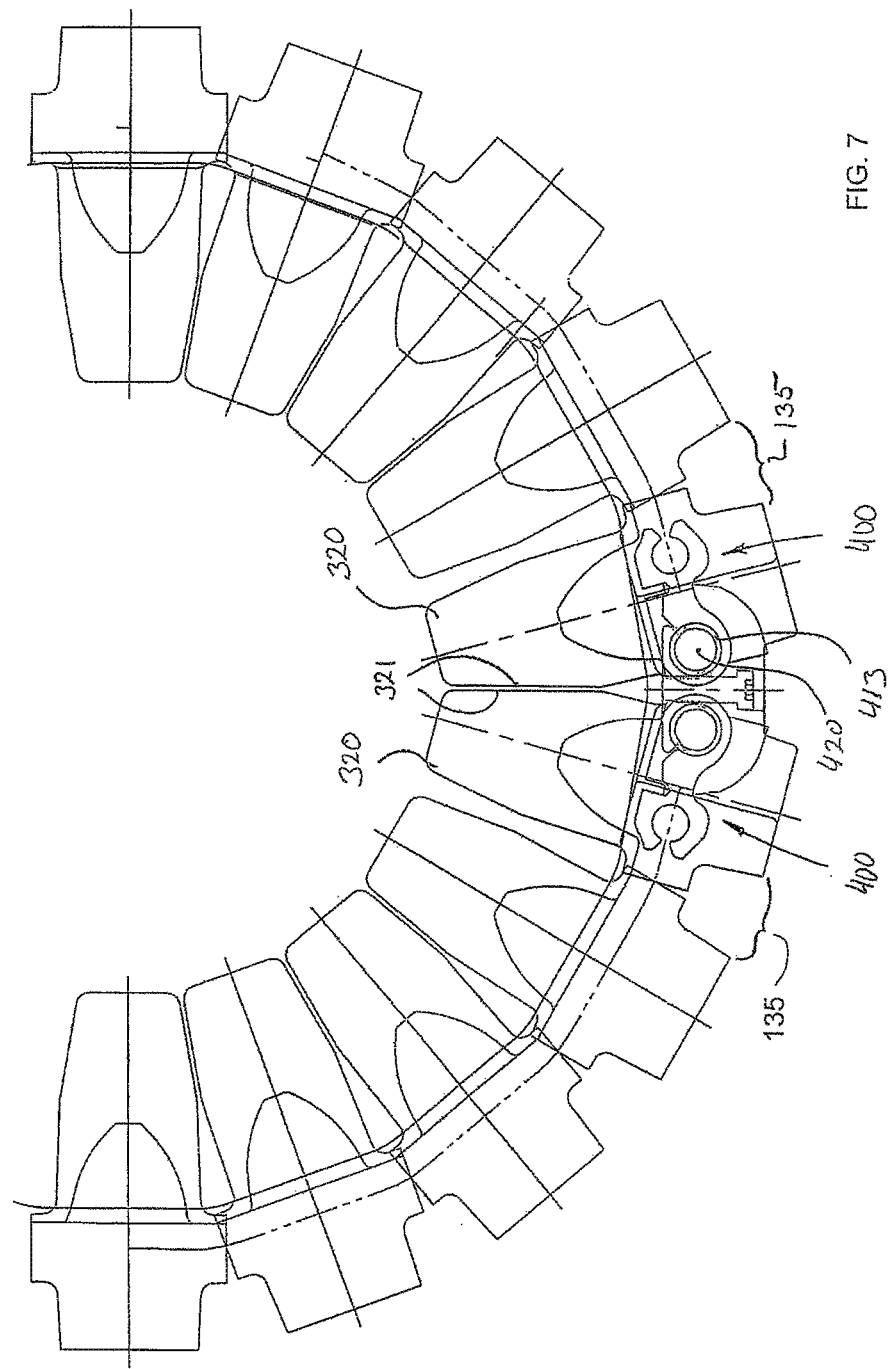
FIG. 7 is a side view of the track of FIG. 2 as wrapped around a schematized wheel.

Referring now to FIGS. 5 and 7, the skilled addressee will note that the guide lugs 320 directly located over the joint element 400 have a shape which differs from the shape of the other guide lugs 320. The main reason for this difference in shape is due to the fact, already explained above, that connected joint elements 400 bend differently from flexible sections 135 (see FIG. 7). Hence, to prevent any interference between the guide lugs 320 located over joint elements 400 when these connected joint elements 400 are in bent state, these particular guide lugs 320 are provided with a special surface 321. The shape of the surface 321 is generally calculated such that the adjacent guide lugs 320 do not interfere with each other when the connected joint elements 400 are in bent state as depicted in FIG. 7.

The skilled addressee will understand that the exact configuration of the guide lugs 320 and of the special surface 321 will depend on the configuration of the track segment 100 and on the diameter of the sprocket wheel, idler wheel and/or road wheels. Different shapes and/or different angles are thus possible (e.g. special surface 821 in FIGS. 8, 11 and 13).

Referring back to FIG. 2, the inner side 440 (i.e. the side facing the wheels) of the joint element 400 is preferably provided with laterally extending grooves 442. The grooves 442 preferably extend transversally of the wheel path 310 defined between the rows of drive lugs 330 and guide lugs 320. The grooves 442 generally allow for a better bonding between the elastomeric material of the track segment 100 and the typically metallic material of the joint element 400. Understandably, the shape, configuration and pattern of the grooves 442 may vary.

Referring now to FIG. 3, the skilled addressee will note that the traction pad 222 located over the joint element 400 differs from the traction lugs 220 of the remaining of the track segment 100. It has been found that it was preferable for the traction pad 222 to have the largest possible contact area or contact patch with the ground.

Single-Pin Segmented Track

Referring now to FIGS. 8 to 13, a second exemplary embodiment of a segmented track 510 incorporating the principles of the invention is shown.

To begin with, segmented track 510, which is usually referred to as a single-pin segmented track, may be seen as a variant of the segmented track 10. The main difference between segmented track 510, when compared to segmented track 10, is the use of a single hinge pin 920 and the absence of clamp connectors as the hinge portions 910 of the joint elements 900 directly mesh with each other as in a conventional door hinge. Aside from these differences, segmented track 510 is, with the applicable modifications, substantially similar to segmented track 10. However, for the sake of complete disclosure, segmented track 510 will be fully described hereinbelow.

Referring to FIG. 8, a portion of the segmented track 510 is shown in more details. The segmented track 510 generally comprises several track segment 600 connected end-to-end via joint elements 900; only two of such segments 600 are shown in FIG. 8.

Track segments 600 are generally identical in construction, except for their length which could possibly vary, and comprise a longitudinally extending track or segment body 650 made of reinforced elastomeric material. Each track segment 600 is provided with two joint elements 900, one at each end thereof. The joint elements 900 are generally integrated to the track body 650 of the track segment 600 during the moulding of the latter.

Figure 9:
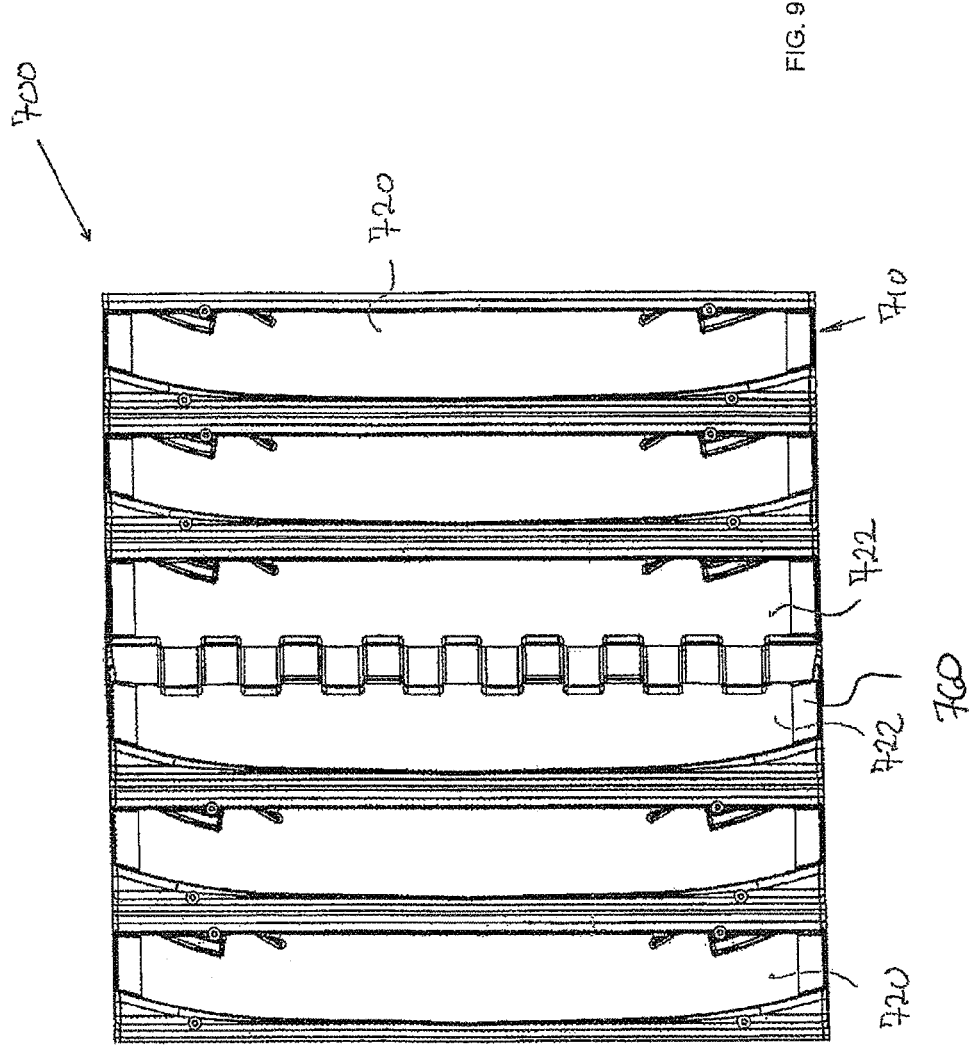
FIG. 9 is an elevation view of the outer surface of the track of FIG. 8.
Figure 10:
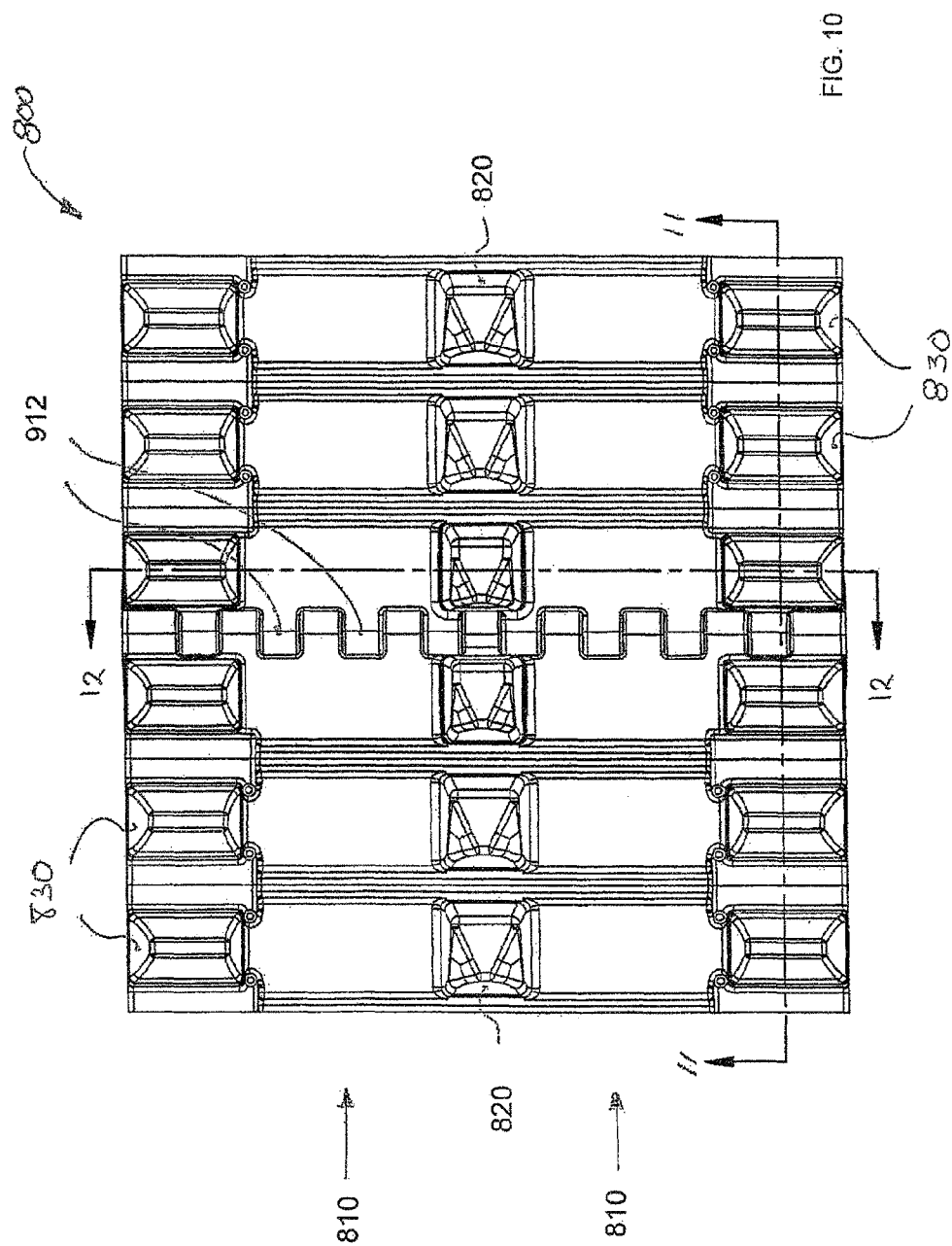
FIG. 10 is an elevation view of the inner surface of the track of FIG. 8.

As depicted in FIGS. 8 to 10, each track segment 600 defines a ground-engaging outer surface 700 and a wheel-engaging inner surface 800. As best shown in FIG. 9, the outer surface 700 is generally provided with a tread 710 composed of a pattern of ground-engaging traction lugs 720. Understandably, the exact shape, configuration and/or disposition of the traction lugs 720 will vary according to the environment in which the track 510 is intended to be used. Hence, different patterns could be used; the present invention is not limited to any particular traction lugs pattern.

For its part, the inner surface 800, best shown in FIG. 10, is generally provided with one or more rows of longitudinally aligned guide lugs 820 and drive lugs 830. The guide lugs 820 generally serve to guide the track 510 between and around the various wheels (i.e. sprocket wheel 20, idler wheel 30 and/or road wheels 40) of the track system 50 (see FIG. 1), and to prevent and/or reduce lateral movements of the track 510 which could lead to detracking. For their part, the drive lugs 830 are generally configured to mesh with the sprocket wheel 20 such as to transmit the power from the motor (not shown) of the vehicle 70 to the track 10.

The guide lugs 820 and the drive lugs 830 are typically laterally spaced along the width of the track segment 600 in order to define wheel path 810 for the various wheels of the track system 50. In the present preferred embodiment, the guide lugs 820 are substantially centrally located with respect to the width of the track segment 600 while the drive lugs 830 are substantially respectively located near the side edges of track segment 600; other configurations are however possible, the present invention is not so limited.

Figure 11:
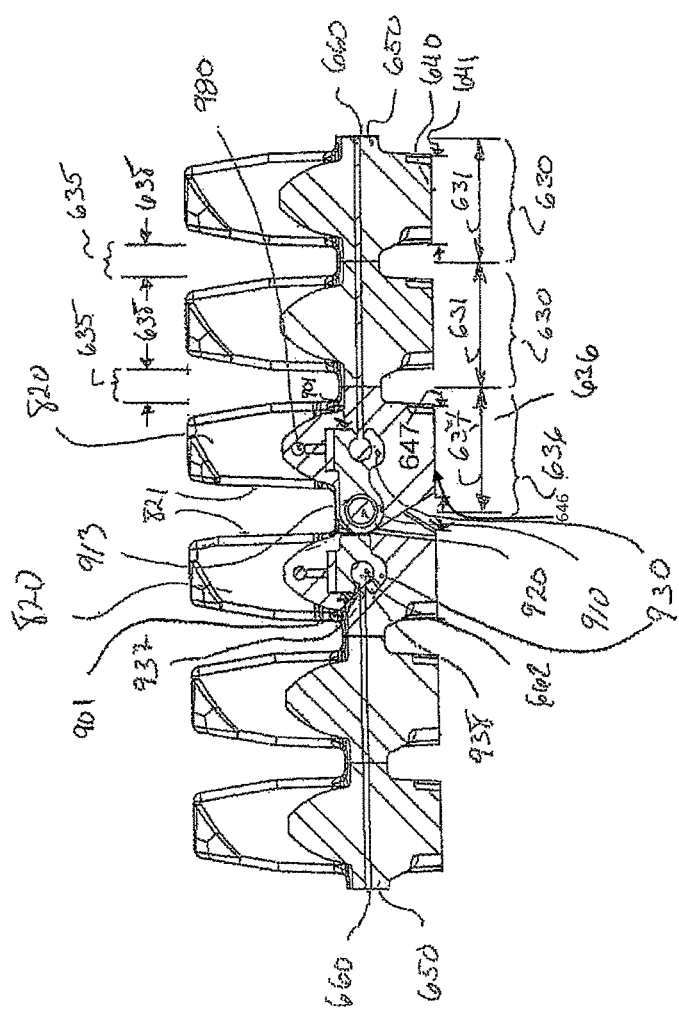
FIG. 11 is a cross-sectional side view of the track of FIG. 8 along line 11-11 of FIG. 10.

Referring now to FIG. 11, the track body 650 of each track segment 600 is generally divided, along its length, into a plurality of longitudinally extending pitch sections 630 defining a pitch length 631. Each pitch section 630 is connected to its adjacent pitch sections 630 via flexible section 635 having length 638 and being preferably devoid of any lugs. These flexible sections 635 generally allow the track body 650 to bend around the sprocket wheel 20, idler wheel 30 and road wheels 40 of the track system 50.

As depicted in FIGS. 9 and 11, the traction lug(s) 720 located on the outer surface 700 of each regular section 630 define a ground-contacting area 640 (see FIG. 11) having a length 641. Similarly, the traction pad 722 located on the outer surface 700 of each extreme section 636 defines a ground-contacting area 646 having a length 647. Preferably, though not necessarily, the length 647 of the ground-contacting area 646 is slightly longer than the length 641 of the ground-contacting areas 640.

Notably, as already explained above and as is apparent from FIG. 11, the length 638 of the flexible sections 635 is significantly shorter than the length 631 of the pitch sections 630. This allows the sections 630 and 636 to have large ground-contacting areas 640 and 646 respectively.

Since track segments 600 must be connected together in order to form the endless track 510, the pitch sections 636 respectively located at each extremity of each track segment 600, i.e. the extreme pitch sections 636, are each provided with a joint element 900 mostly embedded therein.

Each joint element 900 comprises a hinge portion 910 and an anchoring portion 930. As depicted in FIGS. 8, 10 and 11, the hinge portion 910 comprises a series of laterally extending and spaced apart hinge sections 912, each provided with a cylindrical passage or bore 913 through which hinge pin 920 is pivotally mounted. The interior surface of the cylindrical passage 913 can advantageously be provided with bushings to reduce the friction between the hinge pin 920 and the interior surface of the cylindrical passage 913 and to prevent premature wearing of the hinge pin 920 and the interior surface of the passage 913.

As depicted in FIGS. 8, 10 and 11, to attach two track segments 600 together, the hinge portions 910 of adjacent joints 900 are meshed together, i.e. the sections 912 of one joint 900 are received in the recesses 914 of the other joint 900 (see FIG. 8). The hinge pin 920 is then inserted into the cylindrical passages 913 of the hinge sections 912 of both joints 900. Once mounted into the cylindrical passages 913, the hinge pin 920 is generally held in place via spring pins (not shown) or any other functionally equivalent retainers.

As the skilled addressee will understand, when two adjacent joint elements 900 are connected together, the connected joint elements 900 do not bend or flex as the elastomeric material of the flexible sections 635. Hence, as the track 510 wraps around the sprocket wheel 20, the idler wheel 30 or the road wheels 40 of the vehicle 70 (see FIG. 13), the behaviour of the connected joint elements 900 in bent state differs from the behaviour of flexible sections 635 in bent state.

It has been found that when the pitch length 637 of the extreme pitch sections 636 (see FIG. 11) was equal to the pitch length 631 of the regular pitch sections 630, portions of the track segments 600 located near the joint elements 900 would suffer damages.

The solution found to reduce these damages was to have the pitch length 637 of the extreme pitch sections 636 slightly longer than the pitch length 631 of the regular pitch sections 630 in order to compensate for the difference in bending behaviour.

For instance, in the tracks tested, it appeared that to reduce the aforementioned damages, the pitch length 637 would need to be between about 0% and 2% longer than the pitch length 631, preferably between about 0% and 0.5% longer and most preferably between about 0 and 0.1% longer. Understandably, the percentage could vary depending on the exact track and/or joint design; the present invention is not limited to the percentage indicated above.

At this point, the skilled addressee will again note that, as is apparent from FIG. 11, when two joint elements 900 are connected together, their combined length 901 is longer than the length 631 of regular pitch sections 630. This is due to the particular configuration of the track segment 600 wherein the flexible sections 635 are significantly shorter than the pitch sections 630.

Referring now to FIGS. 8 and 11, as mentioned above, each joint element 900 comprises a hinge portion 910 and an anchoring portion 930. The anchoring portion 930 serves to receive and retain the longitudinally extending reinforcing cables 660.

Preferably, each cable 660 is provided, at each of its ends, with retaining elements such as ferrules 662 adapted to be received and retained in the anchoring portion 930.

In the present embodiment, the ferrules 662 are substantially cylindrical in shape and the axis of the ferrules 662 is preferably parallel to the flexion axis of the track segment 600 and to the rotation axis of the hinge pin 920. As best shown in FIGS. 8 and 11, each ferrule 662 is received into the substantially cylindrical channel 932 of the C-shaped anchoring portion 930 of the joint element 900. The anchoring portion 930 is also provided with a laterally extending opening 936 through which the cables 660 extend. The internal diameter of the channel 932 is preferably slightly larger than the diameter of the ferrules 662 such that the ferrules 662 can be slidingly inserted into the channel 932 without too much resistance.

Preferably, the opening 936 is provided with stress relief zones 937 and 938 to prevent premature chafing, wearing and/or breaking of the cables 660. The shape of the stress relief zones 937 and 938 will generally depend on several factors such as the construction of the track segment 600 and the size of the cables 660.

As the skilled addressee will understand, since the axis of the ferrules 662 is parallel to the flexion axis of the track segment 600, the ferrules 662 will, in certain circumstances, be able to slightly pivot within the channel 932 as the track segment 600 bends. This limited degree of liberty can, in certain circumstances, contribute to reducing the strain applied to the cables 660 during bending of the track segment 600. It is to be understood that in segmented tracks, failures often occur where the cables are secured to the joint elements and at the interface between the cables and the ferrules. Hence, any incremental improvement to the engagement between the cables and the joint elements is beneficial to the durability of the track segment.

In a variant of the present embodiment, the extremities of the cables 660 could be connected to a group of larger ferrules 663 (i.e. one ferrule for several cable ends) or to a single unitary ferrule 664 (i.e. one ferrule for all the cable ends). This would understandably reduce manufacturing time but could limit the degree of movement of each cable 660.

In yet another variant shown in FIG. 8A, the extremities of the cables 660 could be retained at the anchoring portion 930A via one or more compression plates 933 configured to engage the extremities of the cables and to be secured to the anchoring portion 930A.

As depicted in FIG. 8A, each track segment 600A defines a ground-engaging outer surface 700A and a wheel-engaging inner surface 800A. The outer surface 700A is generally provided with a tread 710 composed of a pattern of ground-engaging traction lugs 720A. Understandably, the exact shape, configuration and/or disposition of the traction lugs 720A will vary according to the environment in which the track 510 is intended to be used. Hence, different patterns could be used; the present invention is not limited to any particular traction lugs pattern.

In still another variant of the present embodiment, the cables 660 could directly be connected to the anchoring portion 930 without ferrules 662. For example, the ends of the cables 660 could be soldered or brazed directly to the anchoring portion 930. Other methods are also possible.

It has been found, during the exhaustive experimentations already mentioned above, that to prevent premature wearing and/or failure of the track segment and the joint elements thereof, the mechanical behaviour of the extreme pitch sections and of the regular pitch sections should be substantially equivalent.

More particularly, it has been found that the lateral flexibility of the guide lugs 820 located on the extreme pitch sections 636, and over the joint element 900, should be substantially equal to the lateral flexibility of the guide lugs 820 located on the regular pitch sections 630. In other word, when subjected to the same lateral force, the lateral deflection of the guide lugs 820 located on the extreme pitch sections 636 should be substantially equal to the lateral deflection of the guide lugs 820 located on the regular pitch sections 630.

Similarly, it has been found that the longitudinal flexibility of the drive lugs 830 located on the extreme pitch sections 636, and over the joint element 900, should be substantially equal to the longitudinal flexibility of the drive lugs 830 located on the regular pitch sections 630. In other word, when subjected to the same longitudinal force, the longitudinal deflection of the drive lugs 830 located on the extreme pitch sections 636 should be substantially equal to the longitudinal deflection of the drive lugs 830 located on the regular pitch sections 630.

Figure 12:
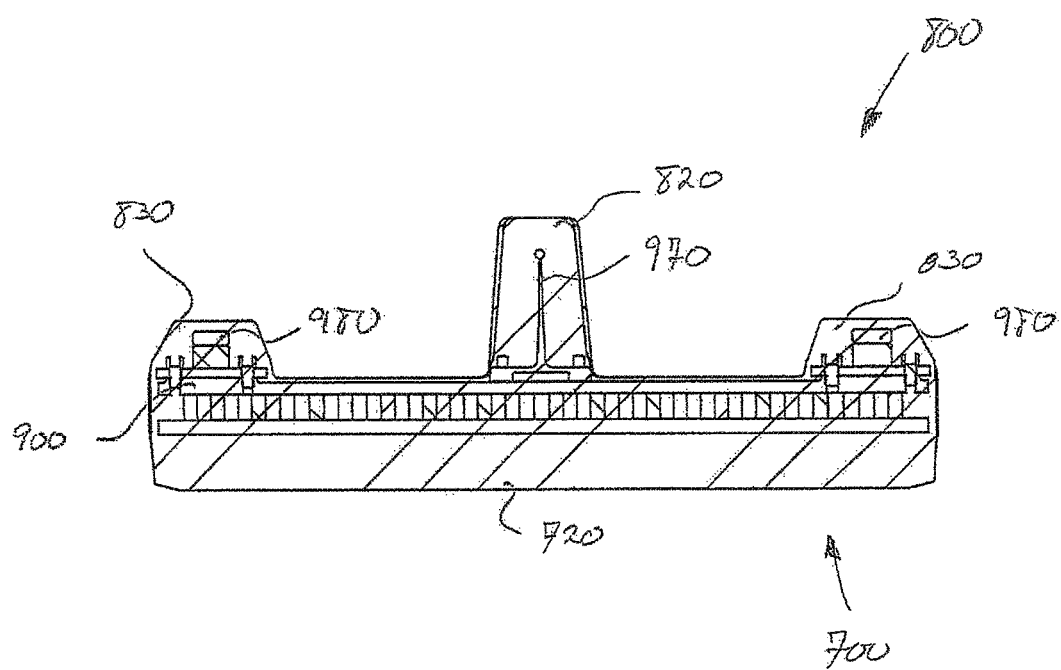
FIG. 12 is a cross-sectional longitudinal view of the track of FIG. 8 along line 12-12 of FIG. 10.

Referring now to FIGS. 8, 11 and 12, each joint element 900 is preferably provided with a guide lug reinforcing element 970 and with drive lug reinforcing elements 980.

The guide lug reinforcing element 970 and the drive lug reinforcing element 980, which shapes respectively depend on the shape of the guide lugs 820 and of the drive lugs 830, serve an important purpose. At the interface between the track body 650 and the joint element 900, there is less elastomeric material underneath the guide lug 820 and the drive lugs 830 as they are directly formed over the joint element 900. The reinforcing elements 970 and 980 thus serve to prevent excessive deflection which could cause cracking and tearing near the base of the guide lug 820 and/or of the drive lug 830.

Preferably, the reinforcing elements 970 and 980 are respectively designed such that the lateral flexibility of the guide lug 820 located on the extreme pitch sections 636 is substantially equal to the lateral flexibility of the guide lug 820 located on the regular pitch sections 630, and such that the longitudinal flexibility of the drive lugs 830 located on the extreme pitch sections 636 is substantially equal to the longitudinal flexibility of the drive lugs 830 located on the regular pitch sections 630.

The reinforcing elements 970 and 980 are preferably made of rigid yet resilient material such as, but not limited to, sheet steel. Indeed, though the reinforcing elements 970 and 980 provide additional support to the guide lugs 820 and to the drive lugs 830, they still have resiliently absorb reasonable deflection under normal driving condition.

Still, it is to be understood that the need for additional support for the guide lugs and drive lugs located over the joint elements 900 can vary according to several factors such as the size of the track, the size of the vehicle, the power of the vehicle, etc.

In addition, it as been found that when the width of the guide lugs 820 located over the joint element 900 was slightly narrower than the width of the other guide lugs 820, the guide lugs 820 located over the joint element 900 would suffer less damages as its lateral flexibility would be comparable to the lateral flexibility of the other guide lugs 820.

In the tested tracks, the width of the guide lugs 820 located over the joint element 900 was between about 80% and 100%, preferably between about 85% and 95%, and most preferably about 90% of the width of the other guide lugs 820.

Understandably, the exact width of the guide lugs 820 located over the joint element 900 could vary according to the track system, track and/or joint design.

Referring now to FIGS. 11 and 13, the skilled addressee will note that the guide lugs 820 directly located over the joint element 900, the guide lugs 820 preferably provided with reinforcing elements 970, have a shape which differs from the shape of the other guide lugs 820. The main reason for this difference in shape is due to the fact, already explained above, that connected joint elements 900 bend differently from flexible sections 635 (see FIG. 13). Hence, to prevent any interference between the guide lugs 820 located over joint elements 900 when these connected joint elements 900 are in bent state, these particular guide lugs 820 are provided with a special surface 821. The shape of the surface 821 is generally calculated such that the adjacent guide lugs 820 do not interfere with each other when the connected joint elements 900 are in bent state as depicted in FIG. 13.

The skilled addressee will understand that the exact configuration of the guide lugs 820 and of the special surface 821 will depend on the configuration of the track segment 600 and on the diameter of the sprocket wheel 20, idler wheel 30 and/or road wheel 40. Different shapes and/or different angles are thus possible (e.g. special surface 321 in FIGS. 2, 5 and 7).

Referring back to FIG. 8, the inner side 940 (i.e. the side facing the wheels) of the joint element 900 is preferably provided with laterally extending grooves 942. The grooves 942 preferably extend transversally of the wheel path 810 defined between the rows of drive lugs 830 and guide lugs 820. The grooves 942 generally allow for a better bonding between the elastomeric material of the track segment 600 and the typically metallic material of the joint element 900. Understandably, the shape, configuration and pattern of the grooves 942 may vary.

Referring now to FIG. 9, the skilled addressee will note that the traction pad 722 located over the joint element 900 differs from the traction lugs 720 of the remaining of the track segment 600. It has been found that it was preferable for the traction pad 722 to have the largest possible contact area or contact patch with the ground.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A segmented track comprising a plurality of interconnected track segments,
   wherein each of said track segments comprises a segment body made of reinforced elastomeric material and having an outer ground-engaging surface, an inner wheel-engaging surface, a first extremity and a second extremity, said segment body comprising a plurality of longitudinally extending sections, each of said sections having a first pitch length and being attached to at least one adjoining section by a flexible portion having a second pitch length and being devoid of any lugs, said sections comprising a first extreme section located at said first extremity and comprising a first joint element, and a second extreme section located at said second extremity and comprising a second joint element, and regular sections there between, said first joint element comprising a first hinge portion and a first anchoring portion, said second joint element comprising a second hinge portion and a second anchoring portion, said track segment comprising longitudinally extending reinforcing elements mounted to and extending between said first and second anchoring portions;
   wherein said first hinge portion of a first track segment is respectively connected to a second hinge portion of a second track segment with a hinge pin; and
   wherein the first extreme section and the second extreme section have an extreme pitch length longer than a pitch length of the regular sections.

2. The segmented track of claim 1, wherein each of said longitudinally extending reinforcing elements comprises a first extremity and a second extremity, wherein said first extremities are provided with at least one first retaining element, and wherein said second extremities are provided with at least one second retaining element, said at least one first retaining element being configured to engage said first anchoring portion, and said at least one second retaining element being configured to engage said second anchoring portion.

3. The segmented track of claim 2, wherein said first anchoring portion comprises a first laterally extending channel and said second anchoring portion comprises a second laterally extending channel, and wherein said at least one first retaining element is received into said first laterally extending channel and said at least one second retaining element is received into said second laterally extending channel.

4. The segmented track of claim 3, wherein said at least one first retaining element is slidingly received into said first laterally extending channel and said at least one second retaining element is slidingly received into said second laterally extending channel.

5. The segmented track of claim 1, wherein each of said reinforcing elements comprises a first extremity and a second extremity, wherein said first extremity of each of said reinforcing elements is provided with a first retaining element, and wherein said second extremity of each of said reinforcing elements is provided with a second retaining element.

6. The segmented track of claim 5, wherein said first anchoring portion comprises a first laterally extending channel and said second anchoring portion comprises a second laterally extending channel, and wherein said first retaining elements are received into said first laterally extending channel and said second retaining elements are received into said second laterally extending channel.

7. The segmented track of claim 6, wherein said first and second laterally extending channels are substantially cylindrical, wherein said first and second retaining elements are substantially cylindrical, and wherein said first retaining elements are slidingly received into said first laterally extending channel and said second retaining elements are slidingly received into said second laterally extending channel.

8. The segmented track of claim 1, wherein said first hinge portion comprises a plurality of laterally extending and spaced apart first hinge sections, and wherein said second hinge portion comprises a plurality of laterally extending and spaced apart second hinge sections.

9. The segmented track of claim 8, wherein said first hinge sections and said second hinge sections are complementary.

10. The segmented track of claim 1, wherein said first joint element comprises guide lugs and/or drive lugs reinforcements respectively extending into guide lugs and/or drive lugs.

11. The segmented track of claim 1, wherein said first joint element comprises first guide lug and/or drive lugs reinforcements respectively extending into guide lugs and/or drive lugs located on said inner wheel-engaging surface of said first extreme section.

12. The segmented track of claim 11, wherein said second joint element comprises second guide lug and/or drive lugs reinforcements respectively extending into said guide lugs and/or drive lugs located on said inner wheel-engaging surface of said second extreme section.

13. A track segment as claimed in claim 12, wherein said first joint element comprises first grooves extending laterally between said first guide lug and/or drive lugs reinforcements.

14. A track segment as claimed in claim 13, wherein said first joint element comprises first grooves extending laterally between said first guide lug and/or drive lugs reinforcements, and wherein said second joint element comprises second grooves extending laterally between said second guide lug and/or drive lugs reinforcements.

15. The segmented track of claim 1, wherein each of said sections is provided, on its inner surface, with drive lugs laterally spaced-apart from guide lugs to define wheel paths therebetween and wherein the lateral flexibility of guide lugs located on extreme sections is substantially equal to the lateral flexibility of guide lugs located on the regular sections.

16. The segmented track of claim 1, wherein each of said sections is provided, on its inner surface, with drive lugs laterally spaced-apart from guide lugs to define wheel paths therebetween and wherein the longitudinal flexibility of drive lugs located on extreme sections is substantially equal to the longitudinal flexibility of drive lugs located on the regular sections.

* * * * *

UNITED STATES PATENT AND TRADEMARK OFFICE
CERTIFICATE OF CORRECTION

PATENT NO. : 9,840,292 B2
APPLICATION NO. : 14/866433
DATED : December 12, 2017
INVENTOR(S) : Alan William Baum et al.

It is certified that error appears in the above-identified patent and that said Letters Patent is hereby corrected as shown below:

In the Specification

Column 1, Line 22:
--This invention was made with government support under contract no. DAAE07-03-CL112 awarded by the United States Army. The government has certain rights in the invention.-- should be inserted as the second paragraph below "CROSS-REFERENCE TO RELATED APPLICATIONS".

Signed and Sealed this
Ninth Day of January, 2024

Katherine Kelly Vidal
*Director of the United States Patent and Trademark Office*